United States Patent [19]
Shimizu

[11] Patent Number: 5,341,614
[45] Date of Patent: Aug. 30, 1994

[54] FLOOR SYSTEM FOR LAYING CABLES AND PIPES UNDERNEATH THE FLOOR

[75] Inventor: Shohachi Shimizu, Ogaki, Japan

[73] Assignee: Mirai Industries Co., Ltd., Anpachi, Japan

[21] Appl. No.: 997,905

[22] Filed: Dec. 29, 1992

[51] Int. Cl.⁵ .............................. E04B 5/43; E04B 5/58
[52] U.S. Cl. ................................. 52/220.1; 52/126.5; 52/126.6; 52/263
[58] Field of Search .................... 52/126.5, 126.6, 263, 52/220.1, 126.5, 126.6, 263

[56] References Cited

U.S. PATENT DOCUMENTS

| | | | |
|---|---|---|---|
| 4,850,162 | 7/1989 | Albrecht | 52/126.6 |
| 4,850,163 | 7/1989 | Kobayashi et al. | 52/126.5 |
| 5,049,700 | 9/1991 | Kobayashi et al. | 52/263 |

FOREIGN PATENT DOCUMENTS

1306680  9/1962  France ................ 52/126.6

OTHER PUBLICATIONS

Utility Model Laid-Open Publication No. 1-98845; Dated Jul. 3, 1989; Shohachi Shimitzu.
Utility Model Laid-Open Publication No. 3-73344; Dated Jul. 24, 1991; Ebisuda, et al.
Utility Model Laid-Open Publication No. 52-16221; Dated Jul. 23, 1975; Iwahashi.

Primary Examiner—James L. Ridgill, Jr.
Attorney, Agent, or Firm—Lackenbach Siegel Marzullo Aronson & Greenspan

[57] ABSTRACT

A floor system for laying cables and/or pipes underneath a floor comprising at least one flooring board, at least one housing space provided beneath said at least one flooring board for housing cables and/or pipes and at least one guide means provided within each said at least one housing space. Cables and/or pipes are to be laid in the housing space by means of said guide means and a cable/pipe distributer means comprising a head member, a connecting means and a rope member, wherein said connecting means is to connect with a cable or a pipe and to drag the cable or the pipe through said housing space as said distributer means travels through said guide means.

20 Claims, 15 Drawing Sheets

FLOOR SYSTEM FOR LAYING CABLES AND PIPES UNDERNEATH THE FLOOR

TECHNICAL FIELD

This invention relates to a floor system for laying cables and/or pipes underneath a floor. This invention more particularly relates to a floor system underneath the floor of a computer room and/or laying cables/wires and/or pipes such as water pipes and gas pipes underneath the floor of an office or a house.

BACKGROUND ART

It is commonly practiced to provide cables underneath the floor of a facility such as a computer room where many cables are used. Japanese Utility Model Unexamined Publication No. 52-16221 discloses a floor system for distributing cables underneath a floor, wherein said floor is supported by a number of supporting columns and the space for distribution of cables is provided underneath the floor. It is necessary in this fabrication to remove all the floor panels along the cable laying routes to distribute cables and then to restore said removed panels after the distribution operation is completed.

Japanese Utility Model Unexamined Publication No. 3-73344 discloses another floor system distributing cables underneath a floor, whereas prefabricated blocklike flooring units comprising floor panels and legs are arranged adjacently to form a floor, said blocklike units creating spaces for distributing cables. It is also required, in this fabrication, to remove all the floor panels along the cable laying routes to distribute cables and then to restore said removed panels after the distribution operation is over.

Japanese Utility Model Unexamined Publication No. 1-98845 discloses still another floor system for distributing cables underneath a floor, whereas flooring units each having an opening upward are arranged adjacently to form a floor and said openings are covered with cover materials after cables are housed in the cable housing spaces. In this case also, it is necessary to remove all the cover materials along the cable laying routes to distribute cables and then to restore said removed cover materials after the distribution operation is completed.

As mentioned above, in all these floor systems, it is required to remove all the floor panels or floor covers along their cable laying routes in order to lay cables, which often causes trouble. The fact that preparation of such a cable laying device underneath the floor of a room is usually first completed tentatively by flooring work and the cable laying work is performed afterward by removing all the flooring panels or the like along the cable laying routes, which unavoidably makes the whole operation more time/energy consuming as well as more expensive.

What is more, it is often necessary in a conventional method of a secondary cable laying operation to move aside computers and other office machines already installed along the cable laying routes in order to additionally install computers, telephones, telecopiers and the like in the room, making the cable laying work underneath the floor much more troublesome.

BRIEF DISCLOSURE OF THE INVENTION

Accordingly, it is an object of the present invention to provide a highly efficient floor system for laying cables underneath a floor without need of removing all the flooring panels or the like as well as for additionally installing cables and/or pipes without need of moving existing office machines such as computers.

It is another object of the present invention to provide a highly efficient floor system for laying pipes such as water pipes and gas pipes underneath a floor without need of removing all the flooring panels and the like along the laying routes, the pipes to be laid using a floor system of the present invention being soft and flexible, ex., pipes made of synthetic resin or rubber.

A floor system for laying cables and/or pipes according to the present invention comprises at least one housing space for housing cables and/or pipes to be formed underneath a floor and at least one guide means formed within said housing space. Cables and/or pipes are to go through said housing space with a help of said guide means.

A floor system prepared as such according to the present invention makes cable and/or pipe laying work underneath a floor possible without removing the flooring panels or the like all the way through the laying routes, comprising the steps of:

removing the floor panels or the like at the places of a floor where a cable (pipe) is to go in and come out, and, if necessary, where the cable (pipe) is to be relayed;

insertingly attaching a cable distributer means to the guide means at said place where the cable is finally to come out or to be relayed;

pushing forth the cable distributer means through said guide means toward said place where the cable is to go in or to be further relayed;

attaching the cable to said distributer means at said place where the cable is to go in or to be further relayed;

drawing back said distributer means through said guide means to said place where the cable is finally to come out or to be relayed together with the cable attached therewith in said housing space; and releasing the cable onto the housing space from the distributer means at this place so that the cable is laid through the housing space.

DESCRIPTION OF THE PREFERRED EMBODIMENTS

Figure 4:
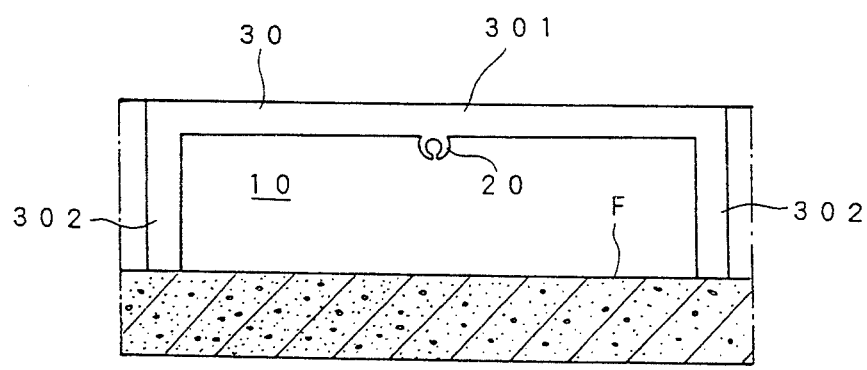
FIG. 4 illustrates a cross-sectional view of a floor system according to the present invention.

A preferred embodiment floor system for laying cables and/or pipes according the present invention comprises a floor block 30 having a square flooring board 301, supporting leg members 302, a housing space 10 opening downward and a guide means 20 on said square flooring board 301 as shown in FIG. 4.

Figure 5:
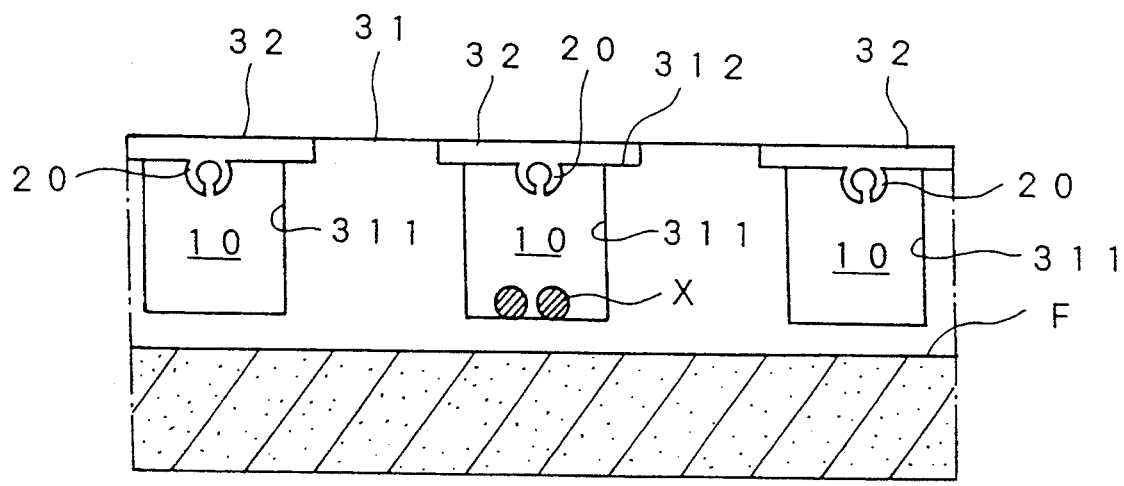
FIG. 5 illustrates a cross-sectional view showing an embodiment of another floor system according to the present invention.

Another preferred embodiment of the floor system for laying cables and/or pipes according to the present invention comprises a housing space 10 opening upward as shown in FIG. 5 to be covered with a floor panel 31 having a guide means 20.

Figure 6:
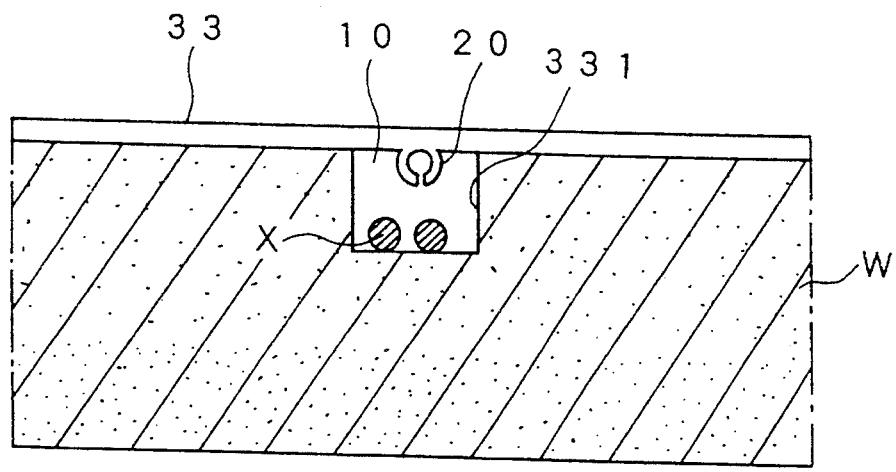
FIG. 6 illustrates a cross-sectional view showing another embodiment of a further floor system according to the present invention.

Another preferred embodiment of the floor system for laying cables and/or pipes according to the present invention comprises a housing space 10 created in a base floor material (W) and a floor cover 33 having a guide means 20 as shown in FIG. 6.

Figure 7:
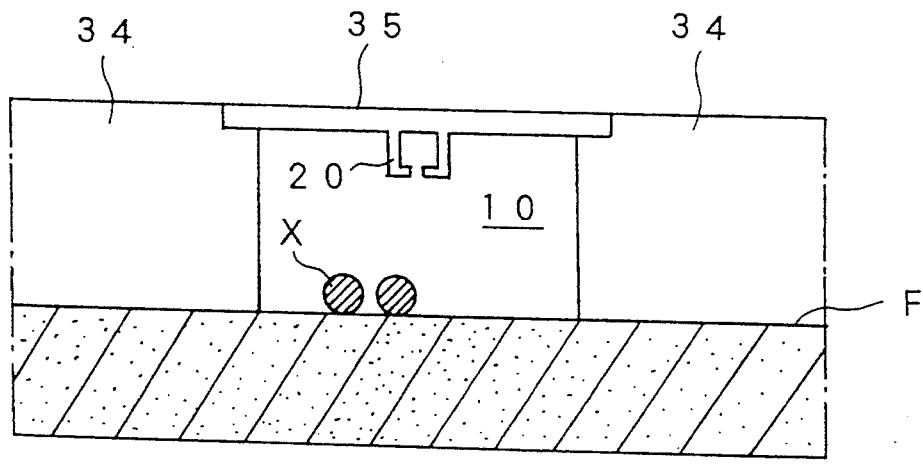
FIG. 7 illustrates a cross-sectional view showing another embodiment use of still another floor system according to the present invention.

Another preferred embodiment of the floor system for laying cables and/or pipes according to the present invention comprises a housing space 10 provided between floor support materials 34 and a floor board 35 having a guide means 20 as shown in FIG. 7.

All the above embodiments comprise a housing space 10 for housing cables and/or pipes (X) and a guide means 20 for guiding a distributer means (not shown yet).

In the following, a detail of said embodiments is described along with a detail of other embodiments of the present invention.

Figure 8:
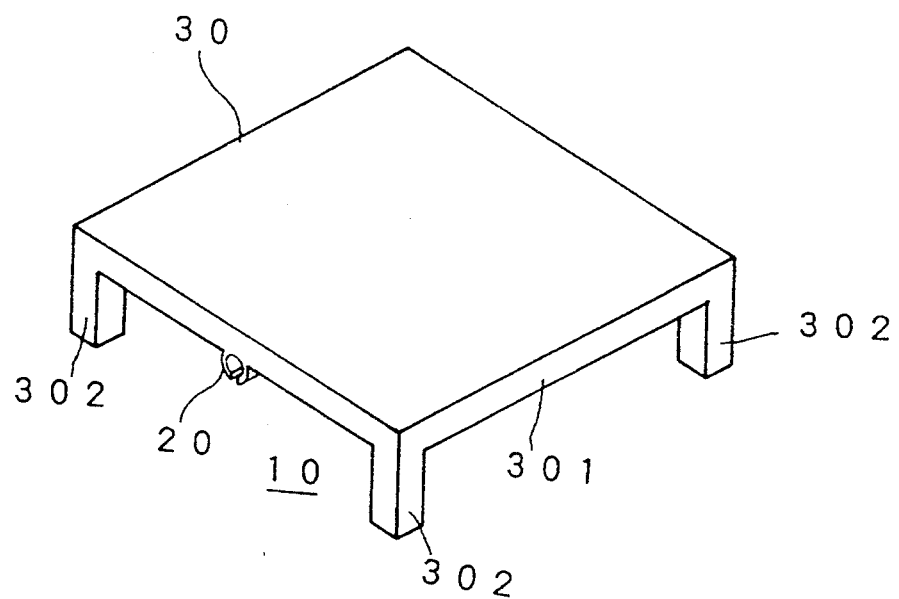
FIG. 8 illustrates a perspective view showing the floor system of FIG. 4.

The floor block 30 in FIG. 4 comprises a square flooring board 301 and four leg members 302 provided at the four corners of the square flooring board 301 as shown in FIG. 8. The leg members 302 are to be embedded in a base floor (F) and a housing space 10 is formed by said four leg members 302 and said base floor (F). Said square flooring board 301 and said four leg members 302 can be formed as one integrated unit at the time of production or can be prepared separately to be integrated later. The length of the leg members 302 can be any length so long as a sufficient housing space for housing cables and/or pipes may be secured. The length of the leg members 302 can be made adjustable as well.

Said square flooring board 301 must be strong enough to support the total weight of workers working thereon and various office machines installed thereon. The material for such a board 301 may be a synthetic resin or a metal. Said leg members 302 must be also strong enough to support said weight plus that of the floor. The material for the leg member 302 may be a synthetic resin or a metal. The bottom side of said board 301 is provided with a guide means 20 substantially in the center thereof for guiding a distributer means. Said base floor (F) is meant to include a base floor material (W) such as the one in FIG. 6 with or without a floor covering material laid thereon.

Figure 9:
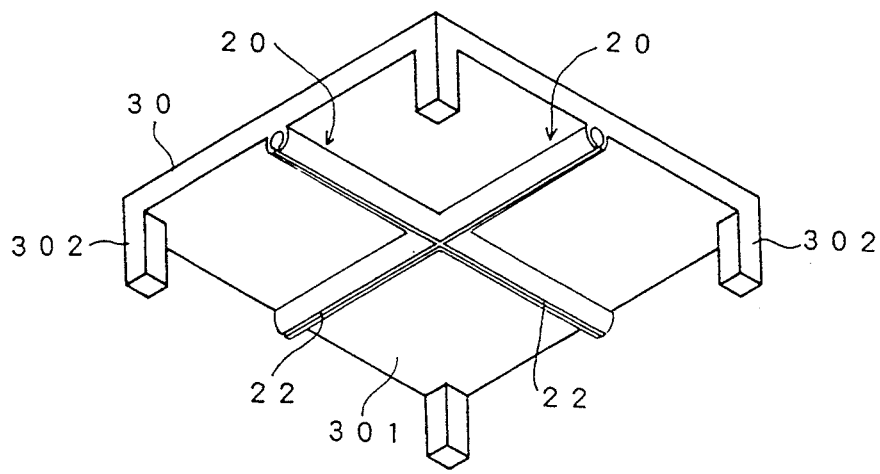
FIG. 9 illustrates a perspective view seen from the bottom side showing a modified embodiment of the floor system of FIG. 4.
Figure 10:
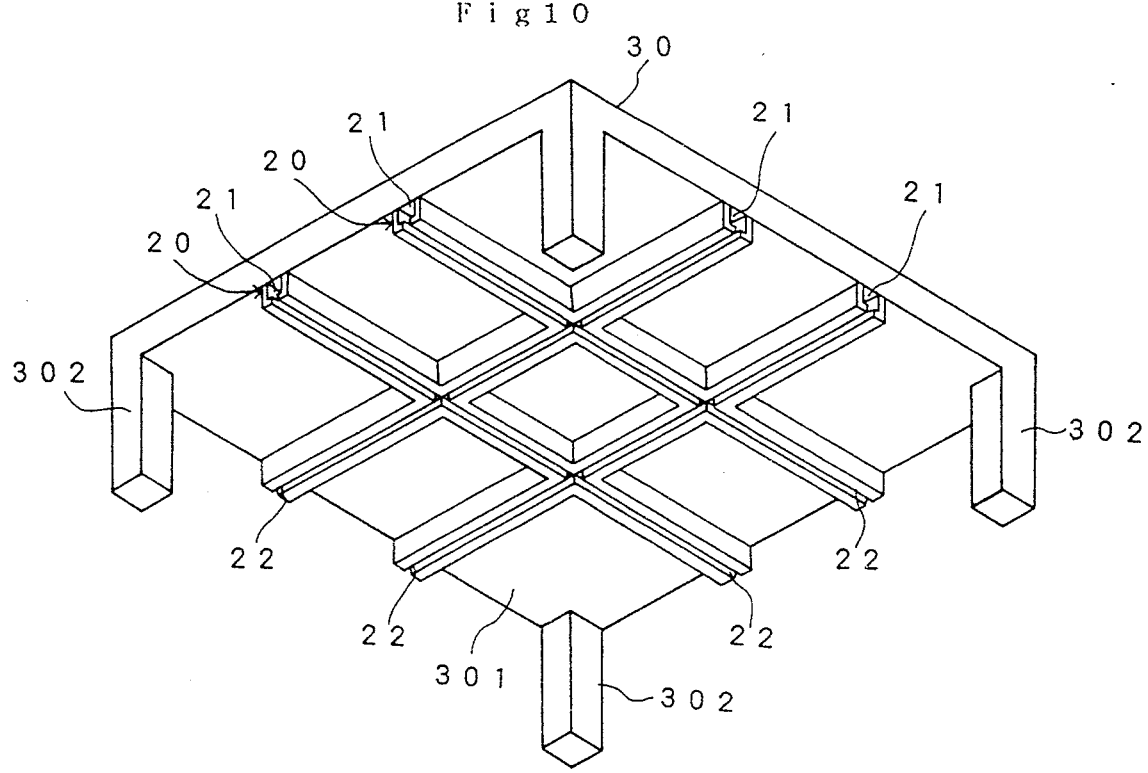
FIG. 10 illustrates a perspective view seen from the bottom side showing still another modified embodiment of the floor system of FIG. 4.
Figure 11:
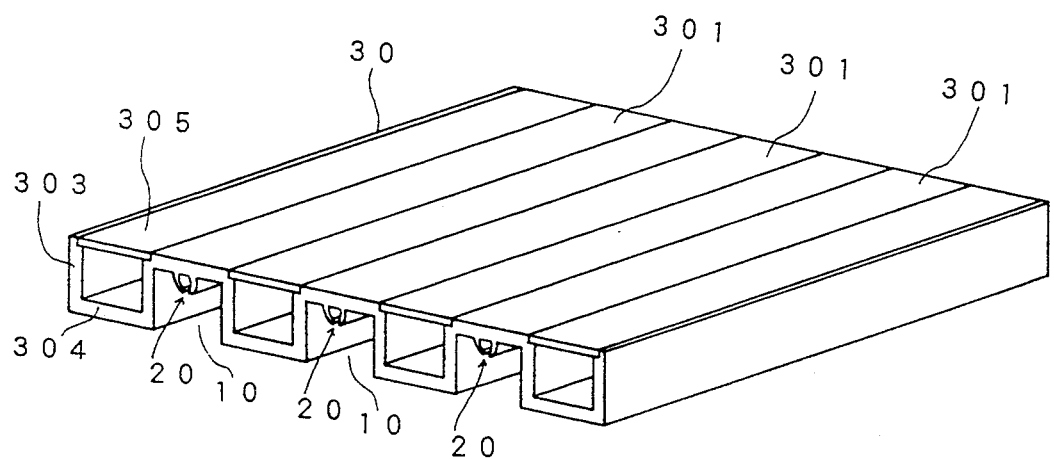
FIG. 11 illustrates a perspective view showing another modified embodiment of the floor system of FIG. 4.

Said square flooring board 301 may be provided with a pair of guide means 20 crossing at a right angle in their center as shown in FIG. 9. Said pair of guide means 20 may run off parallel to the side lines of said square flooring board 301. Said square flooring board 301 can also be provided with more guide means 20 such as shown in FIG. 10. A floor block 30 provided such guide means 20 enables a multi-directional distribution of cables and/or pipes. Another embodiment of a floor block 30 according to the present invention comprises, as shown in FIG. 11, a plurality of rectangular floor boards 301, rectangular side boards 303 and rectangular bottom boards 304. A housing space 10 is provided directly beneath each said rectangular floor board 301. Top cover boards 305 cover the upward openings created by said side boards 303 and said bottom boards 304. Guide means 20 can be provided supported by said side boards 303 over said housing spaces 10 by a bridging means or can be directly provided on the bottom sides of said rectangular floor boards 301.

Figure 12:
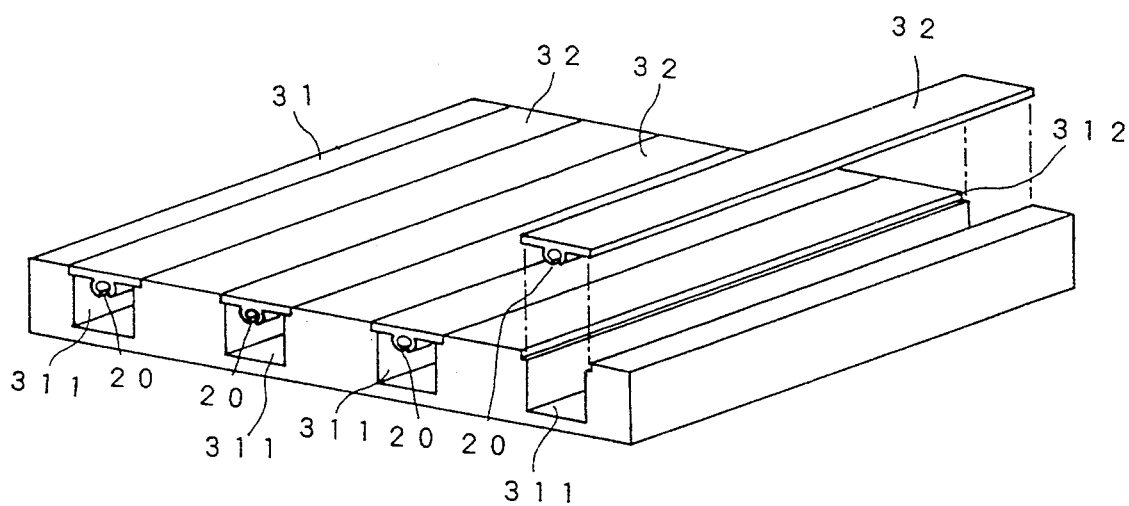
FIG. 12 illustrates a perspective view showing the floor system of FIG. 5.

The floor panel 31 shown in FIG. 5 comprises a plurality of housing channels 311 to be used as housing spaces 10 as shown in FIG. 12. Said housing channels 311 are covered with cover boards 32. Each said cover board 32 is provided with a guide means 20. Said floor panel 31 if prepared of synthetic resin can be provided with steps 312 on both sides such that the cover boards 32 can be placed coplanar with the overall floor surface. The floor panel 31 if prepared of concrete may be covered with a single overall cover board 32 having a plurality of guide means 20 thereunder, since making of such steps 312 thereon is not suitable in case of concrete. Such single overall board 32 can be prepared such that the portions covering said housing channels 311 are made of metal and the other portions are made of elastic material such as a syntethic resin so that the single overall board 32 can be rolled up when not in use, making it easy to carry the overall board 32. Said metal portions and said elastic portions can be produced as a single unit or can be prepared separately to be integrated at a later stage.

The floor system for laying cables and/or pipes according to the present invention introduced in FIG. 6 comprises an elongated housing channel 331 provided embeddedly in a base floor material (W) to be used as a housing space for cables and/or pipes.

Figure 13:
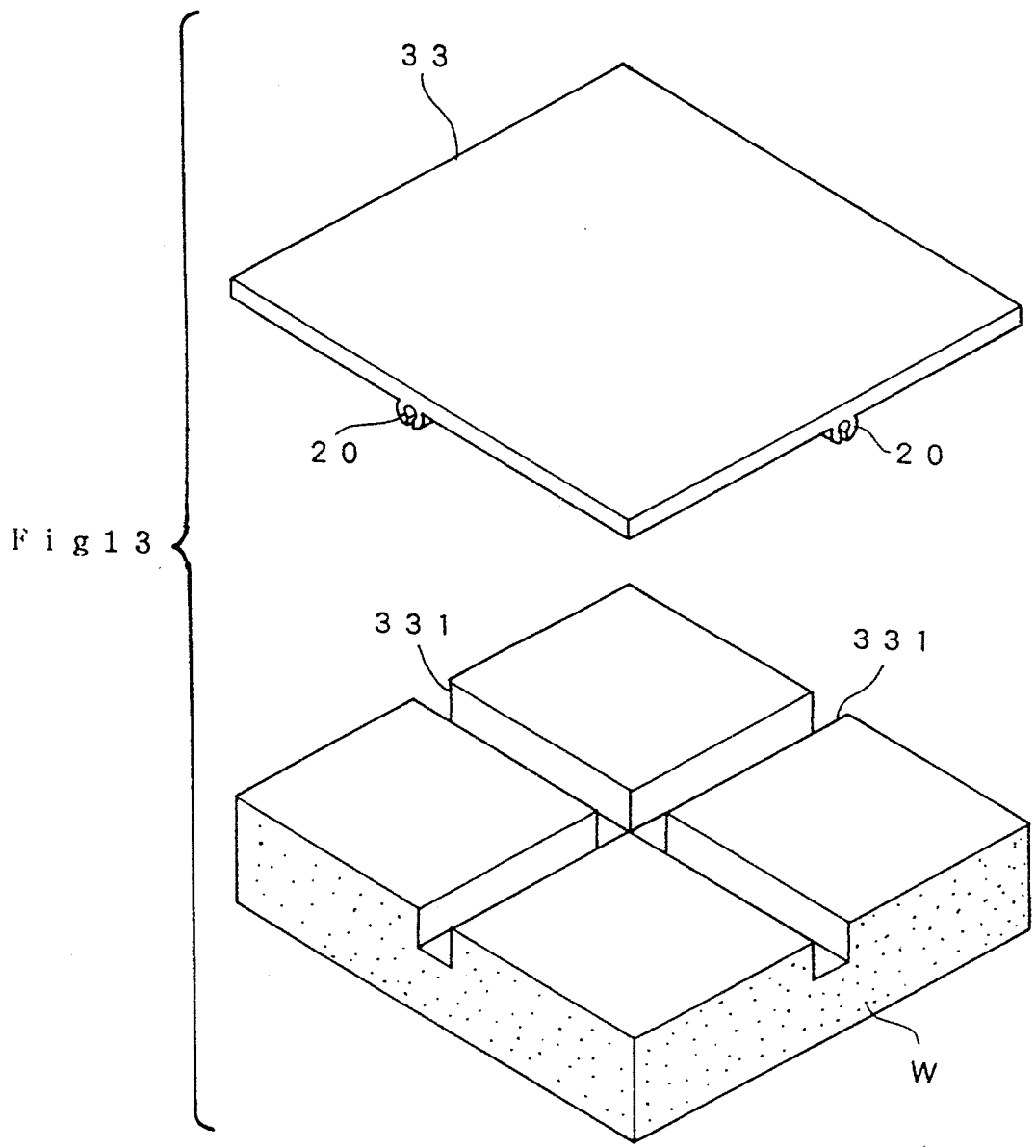
FIG. 13 illustrates a perspective view showing the floor system of FIG. 6.

In a modification as shown in FIG. 13, a floor cover 33 provided with a pair of guide means 20 crossing each other at their center covers the elongated housing channels 331 also crossing in their center, and said guide means 20 are placed in said housing channels 331. Said base floor material (W) may be prepared at the site of the cable laying operation or prefabricated in a factory to be carried into the site. Said floor cover 33 may comprise hard portions covering the housing channels 331 and soft portions covering the other portions. Said hard portions and said soft portions can be prepared as a single unit or can be prepared separately to be integrated at a later stage.

A plurality of said housing channels 311 or 331 as shown in FIGS. 12 and 13 can run parallel to one another or can cross each other. They can be provided on the side portions of the housing channels 311 or 331 instead of the places under said cover boards 32 or floor covers 33.

Figure 14:
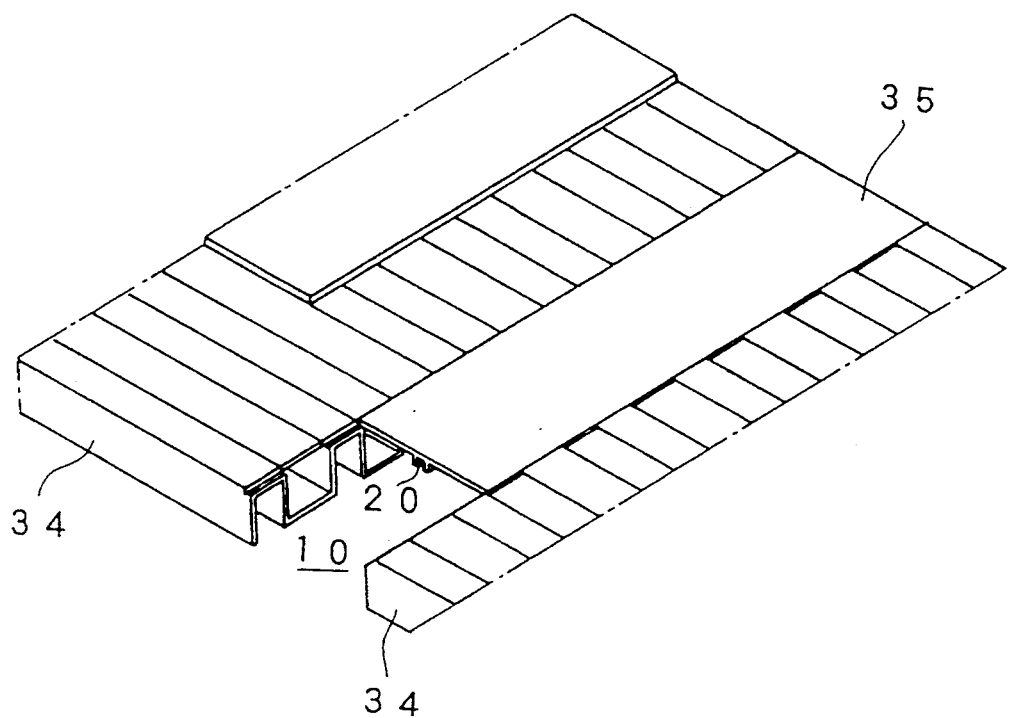
FIG. 14 illustrates a perspective view showing an embodiment use of the floor system of FIG. 7.

The floor system for laying cables and/or pipes in accordance with the present invention introduced in FIG. 7 comprises support materials 34 to be provided embeddedly in a base floor (F), a housing space 10 formed between the support materials 34 and a floor board 35 as shown in FIG. 14. Said floor board 35 is provided with a guide means 20 underneath. Said support materials 34 should be high enough so that cables and/or pipes can be laid in the housing space 10. The support members 34 can be columns or blocks as shown in FIG. 8, or can be like the ones shown in FIG. 12. The floor board 35 is made of metal or synthetic resin. A plurality of guide means 20 can be provided in parallel with one another or crossing each other. The guide means 20 can be provided on the side portions of said support materials 34 facing said housing spaces 10 instead of underneath said floor boards 35.

The most preferred floor system for laying cables and/or pipes of the present invention is the one introduced in FIG. 8.

Figure 3:
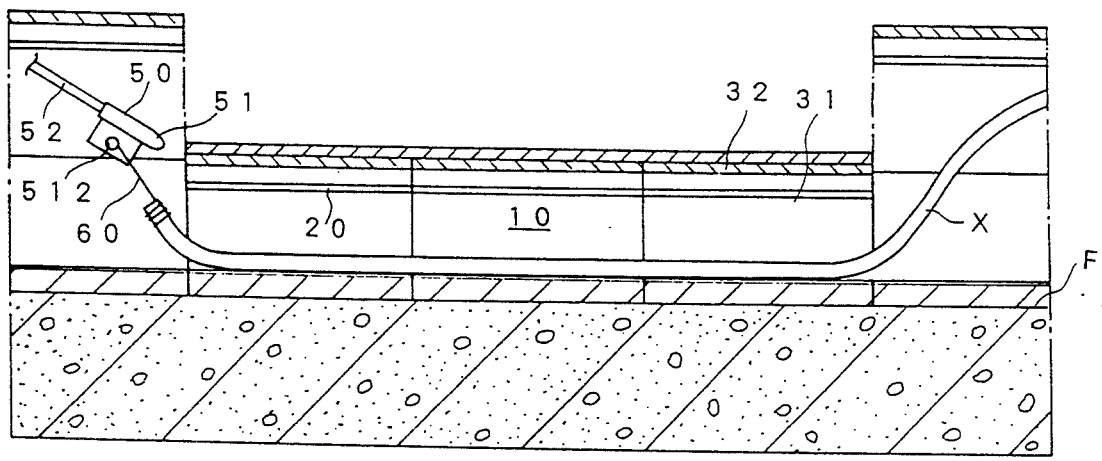
FIG. 3 illustrates a sectional view showing yet another step in using the floor system of FIG. 1 for laying a cable or a pipe according to the present invention.

Said guide means 20 accepts a distributer means 50 such as shown in FIG. 3. The guide means 20 therefore need possess a guidance function for such a distributer means 50. A guide means 20 according to the present invention comprises a distributer retaining means and a distributer traveling means for such a distributer means 50. In the following description, there are introduced some preferred embodiments for guide means 20 and distributer means 50 according to the present invention.

Figure 2:
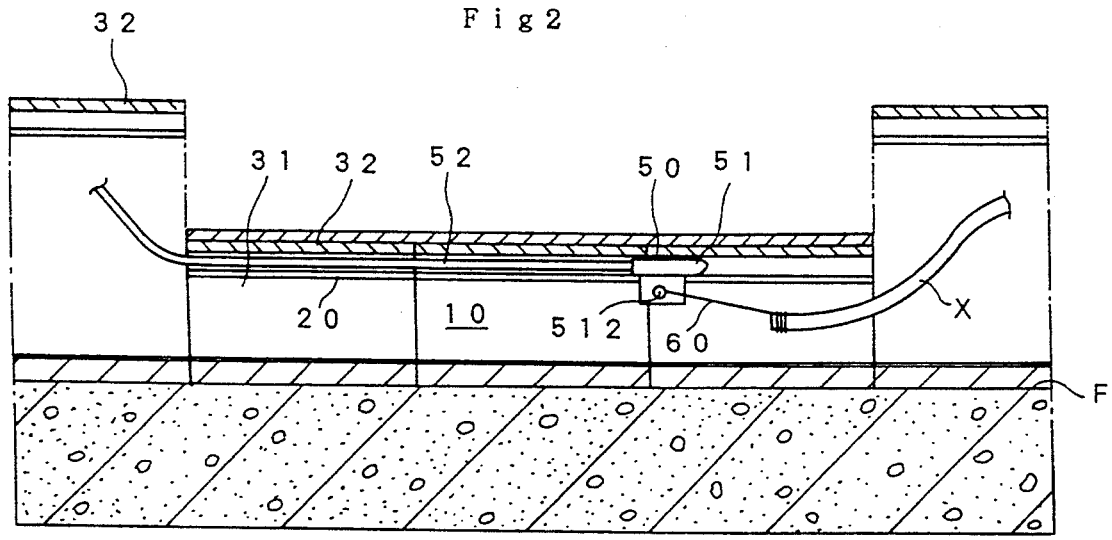
FIG. 2 illustrates a sectional view showing another step in using the floor system of FIG. 1 for laying a cable or a pipe according to the present invention.
Figure 15:
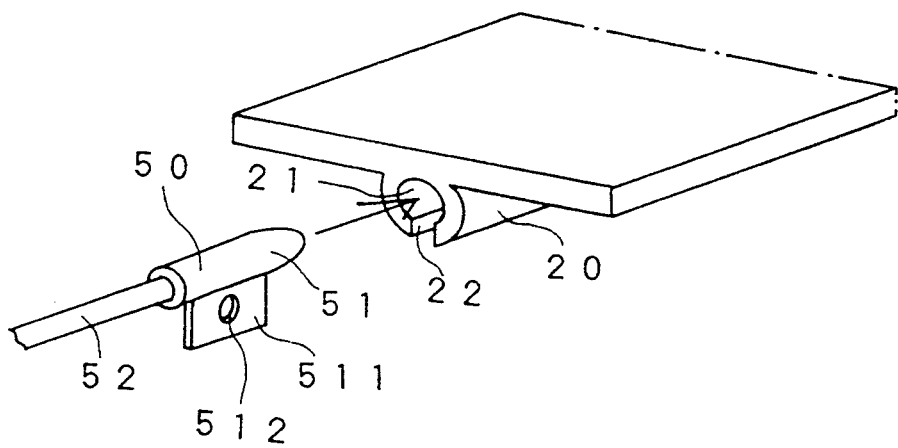
FIG. 15 illustrates a perspective view showing a guide means and a distributer means according to the present invention.

An embodiment of a guide means 20 is shown in FIG. 15. Said guide means 20 is provided with an elongated open slit 22 running along the axis of said guide means 20. A passage 21 is formed throughout said guide means 20. The distributer means 50 is formed such that the distributer means 50 can go through said passage 21 smoothly. The distributer means 50 as shown in FIG. 15 comprises a tongue member 511 having a connecting hole 512 therein, a head member 51 integratedly attached with said tongue member 511 and a rope member 52 fixedly attached at one end to said head member 51. Said head member 51 is to be held in said passage 21 as it goes forward or backward with said tongue member 511 protruding out from said open slit 22. A string member 60 which is to be connected at one end with a cable or a pipe X as shown in FIG. 2 is to be connected at the other end with said connecting hole 512. Said rope member 52 should be hard enough so that the rope member 52 and said head member 51 can be sent forward throughout said passage 21 by means of pushing forward the rope member 52 at an opening of said passage 21. Said rope member 52 also need be strong enough so that said rope member 52 can drag a cable or a pipe (X) over said housing space 10 as said rope member 52 is pulled back throughout said passage 21. Such a rope member 52 may be a steel wire or a synthetic resin rope. It can also be a barlike hard rope in some utilization cases. Said guide means 20 may take practically any shape in the section. It can be circular, rectangular or even triangular, though a circular one is most preferred.

Figure 16:
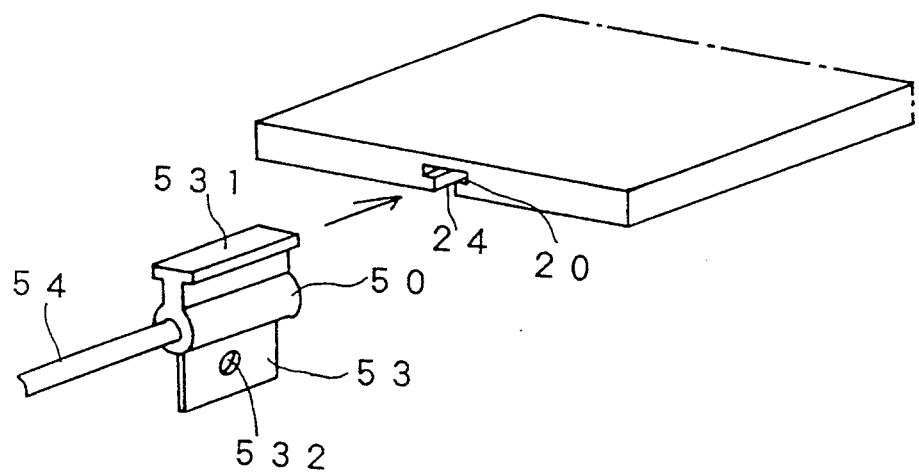
FIG. 16 illustrates a perspective view showing another guide means and another distributer means according to the present invention.

Another preferred embodiment of the floor system for laying cables and/or pipes according to the present invention is introduced in FIG. 16. The guide member 20 in this embodiment comprises a T-shape passage 24 formed in a flooring panel as shown in FIG. 16. The distributer means 50 to be used in this embodiment comprises a head portion 531 having winglike protrusions, a tongue member 53, a connecting hole 532 provided in said tongue member 53 and a rope member 54 fixedly attached to said head portion 531. Said T-shape passage 24 can take a slightly different shape so long as said distributer means 50 does not come off the passage 24. The rope member 54 can be provided at a predetermined interval (not shown) with a plurality of such head portions 531 instead of just one on one end.

Figure 17:
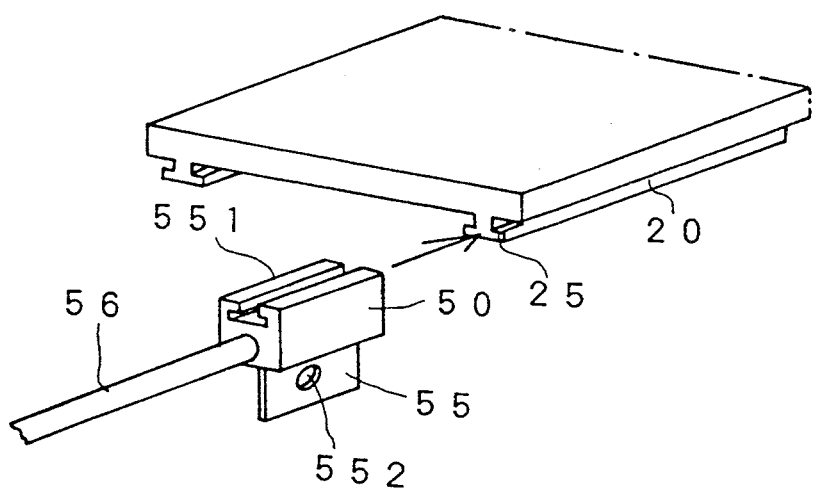
FIG. 17 illustrates a perspective view showing still another guide means and another distributer means according to the present invention.

Another embodiment of the floor system for laying cables and/or pipes according to the present invention is introduced in FIG. 17. The guide means 20 in this embodiment comprises a T-shaped protrusion with wings 25 as shown in FIG. 17. The distributer means 50 in this case comprises a head member 551 having a T-shape receiver groove, a tongue member 55, a connecting hole 552 in said tongue member 55, a rope member 56 fixedly attached to said head member 551. The rope member 56 can be provided at a predetermined interval (not shown) with a plurality of such head members 551 and said tongue members 55 with said holes 552 instead of just one.

A distributer means 50 of the present invention can comprise different members as long as the distributer means 50 can be held in a guide means 20 securely at it travels therein and the distributer means 50 possesses a connecting means for a cable or a pipe, and as long as the connecting means holding a cable or a pipe can smoothly travel forth and back throughout the guide means 20. A distributer means 50, for example, can comprise a head portion and a connecting hole directly provided thereon. Said connecting hole can be replaced by another connecting means so long as said connecting means can be properly and easily connected with a cable or a pipe.

Figure 18:
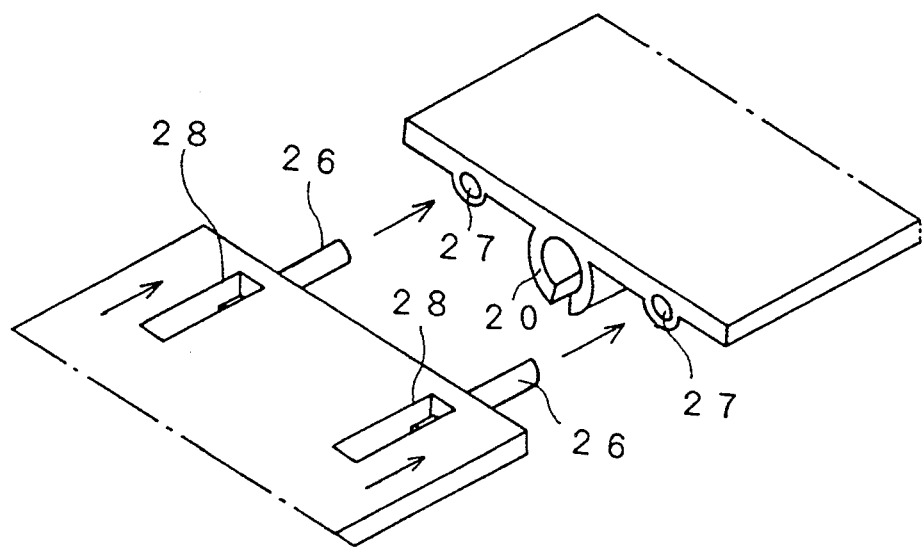
FIG. 18 illustrates a perspective view showing an embodiment connecting means of a guide means according to the present invention.

In a practical utilization of the present invention, a plurality of guide means 20 alignedly connected one after another are most likely used. A plurality of guide means 20 are alignedly connected with one another utilizing pin members 26 and pin accepters 27 as shown in FIG. 18 in a preferred embodiment of use so that the plurality of guide means 20 are always aligned to enable a distributer means 50 to travel throughout said plurality of guide means 20 smoothly. Such a pin-receiver combination can be provided in other parts of a floor system of the present invention, for example, in a guide means 20, a floor block 30 or a support material 34. The alignment means shown in FIG. 18 further comprises two windows 28 from which said pin members 26 can be provided into said pin receivers 27. It is possible or sometimes preferable to make the entrance (exit) portions of the guide means 20 of the present invention slightly wider than the remaining portion of the guide means 20 so that a slight dislocation of alignment, which may be caused by a variety of factors, can be practically ignored in a cable and/or pipe laying operation.

Figure 19:
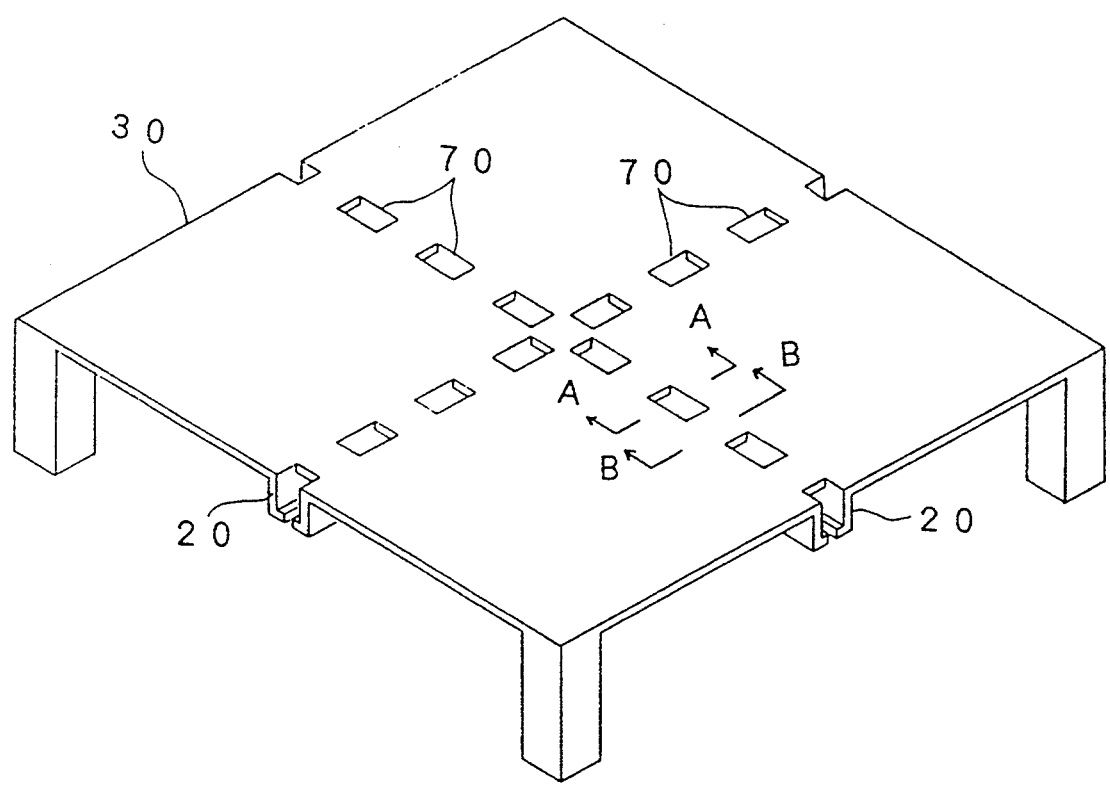
FIG. 19 illustrates a perspective view showing another modification of the floor system of FIG. 4.
Figure 20:
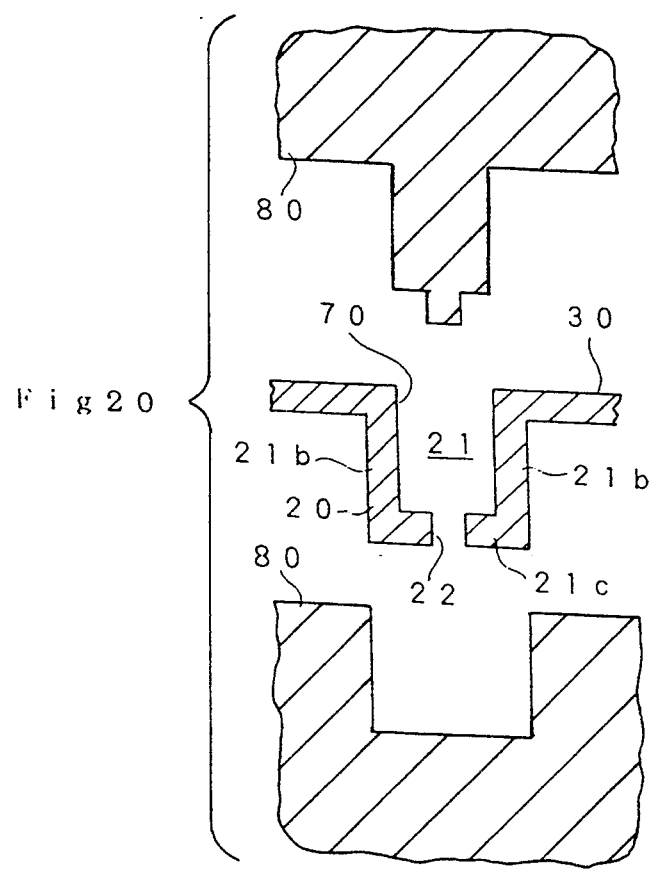
FIG. 20 illustrates a cross-sectional view of the modification of the floor system of FIG. 19, cut along the 20—20 line, and the fabrication mold.
Figure 21:
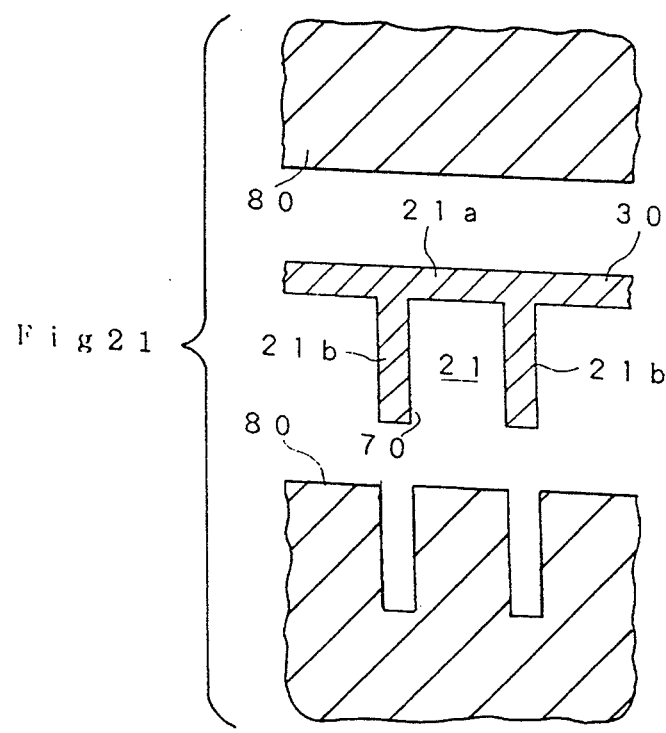
FIG. 21 illustrates a cross-sectional view of the modification of the floor system of FIG. 19, cut along the 21—21 line, and the fabrication mold.
Figure 22:
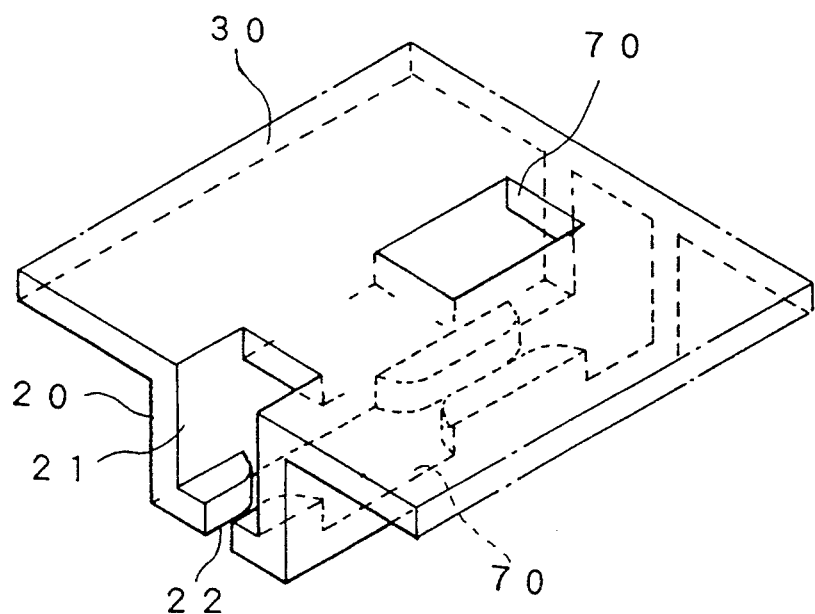
FIG. 22 illustrates a perspective view clearly showing one of the guide portions of the floor system of FIG. 19.
Figure 23:
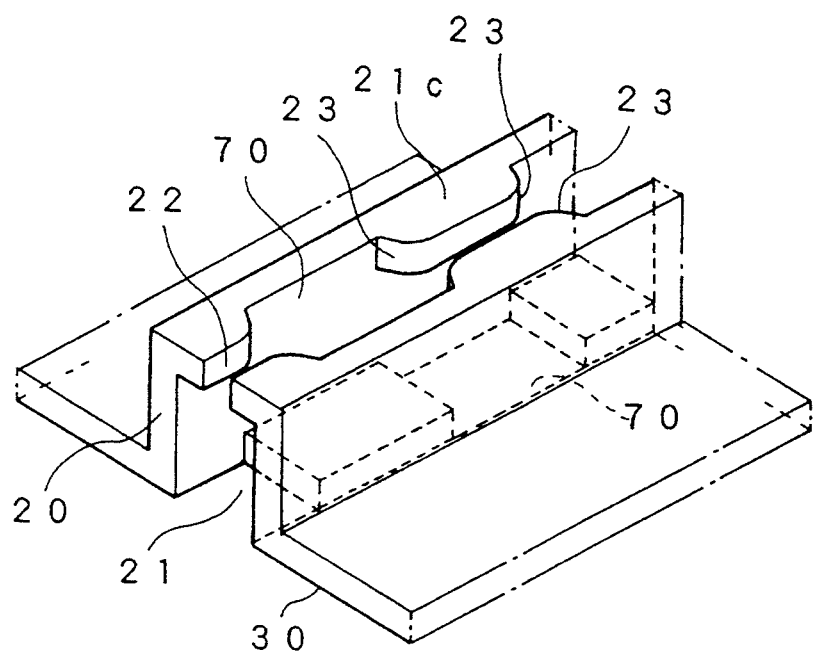
FIG. 23 illustrates a perspective view showing the bottom side of the guide portion of FIG. 22.
Figure 24:
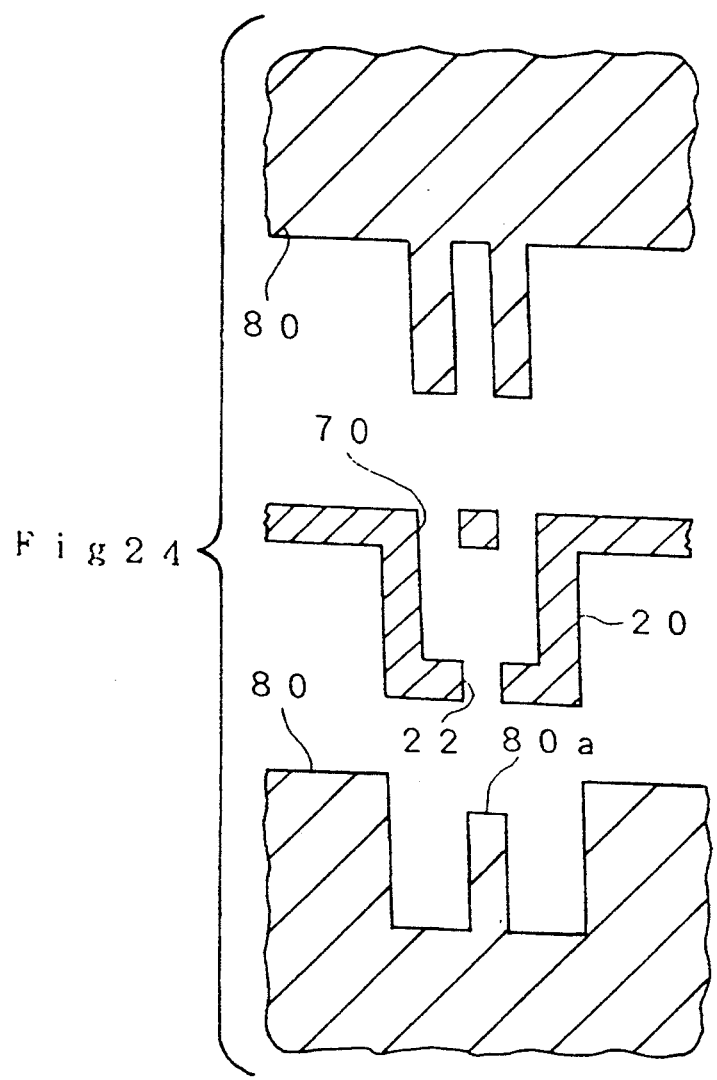
FIG. 24 illustrates a cross-sectional view of a further modified floor system of the modification of FIG. 19, cut along the section corresponding to the 20—20 line in FIG. 19.
Figure 25:
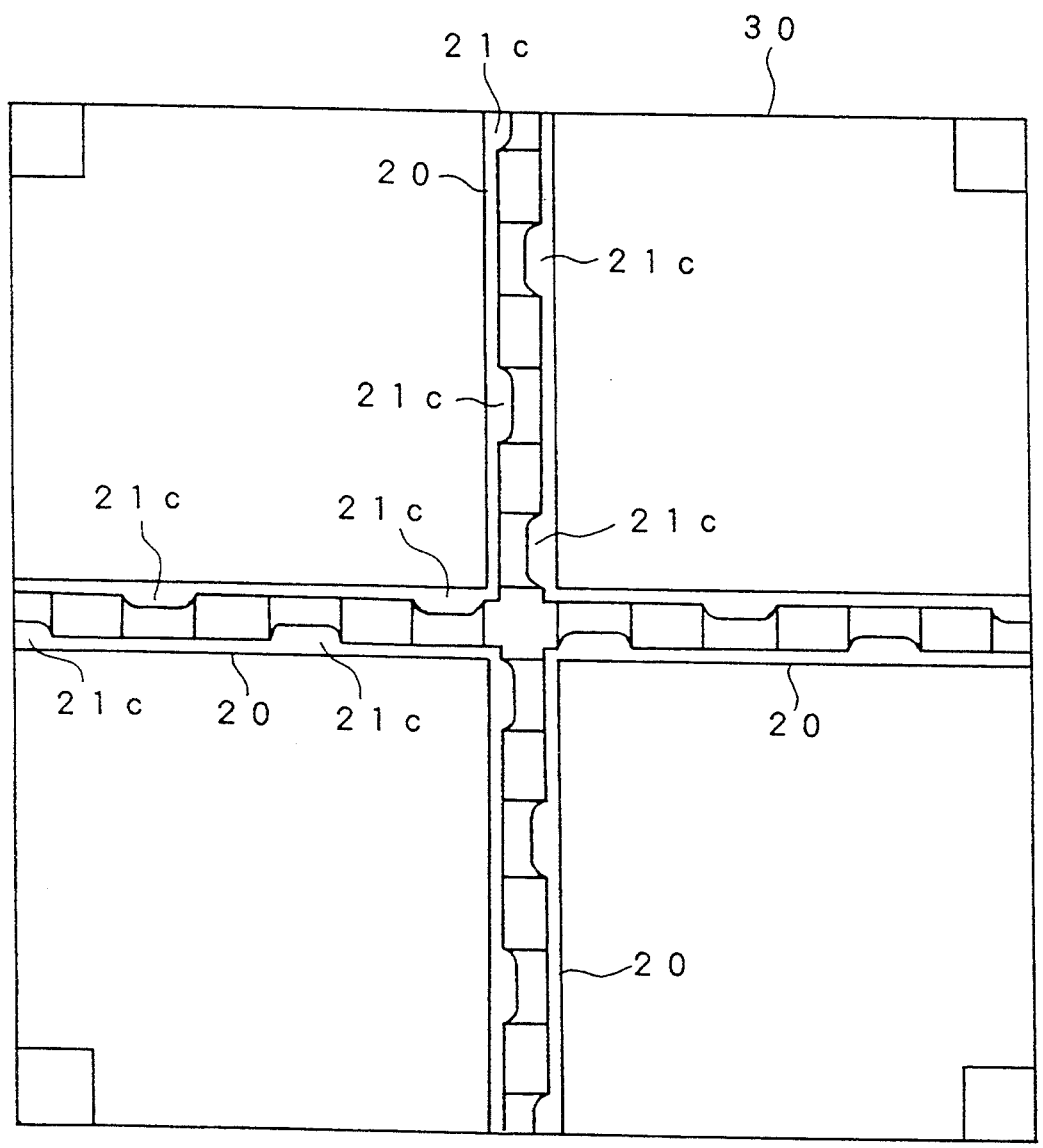
FIG. 25 illustrates a bottom view showing still another modification of the floor system of FIG. 19.

It is technically difficult to make a floor block 30 as shown in FIG. 8 or a floor cover 33 as shown in FIG. 13 in a single molding process. In order to prepare such a floor system for laying cables and/or pipes in accordance with the present invention in a single manufacturing process as a single unit, a floor block 30 as shown in FIG. 19, for instance, is proposed. As shown in FIG. 20 which illustrates the sectional view as cut along the 20—20 line in FIG. 19 and in FIG. 21 which illustrates the sectional view as cut along the 21—21 line in FIG. 19, a set of molds 80 as shown therein will be able to produce such a floor block 30 in an operation, wherein numeral 70 represents the opening portion, numeral 21 represents the passage, 21(a) represents the top floor, 21(b) represents the side walls and 21(c) represents the bottom part of the guide means 20. The passage 21 in this case is formed discontinuously as shown in FIGS. 23 and 25. Therefore the head member 51 of the distributor means 50 in this case need be longer than the opening portion 70 so that said distributer means 50 does not fall off said passage 21 (opening portion 70) when it travels through the passage 21. It is preferred to provide said bottom parts 21(c) with round portions 23 as shown in FIGS. 23 and 25 so that the tongue member 511 of the distributer means 50 can go through said passage 21 smoothly.

Figure 1:
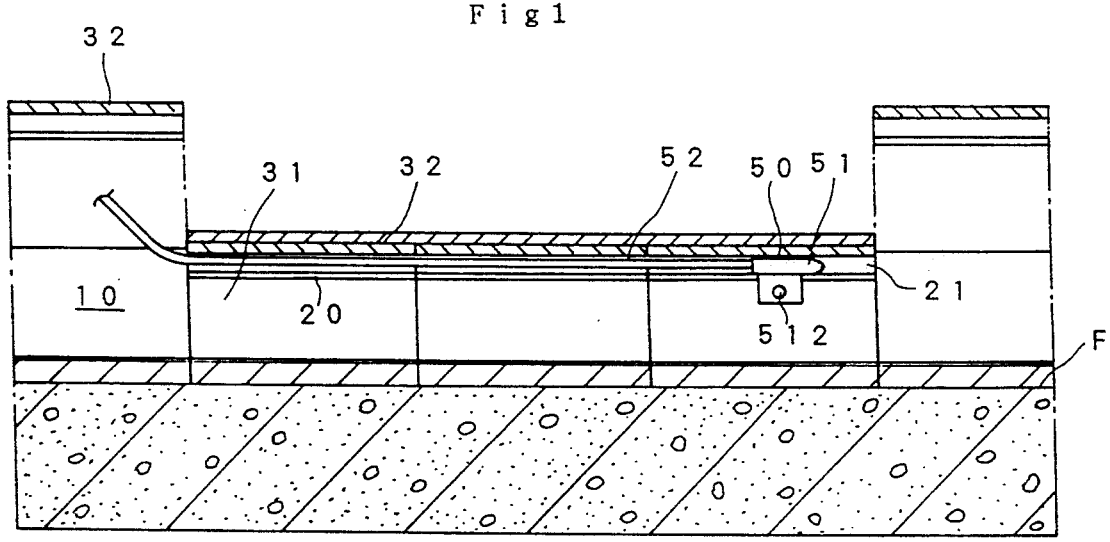
FIG. 1 illustrates a sectional view showing a step in using may inventive floor system for laying a cable or a pipe according to the present invention.

An embodiment method for laying a cable or a pipe according to the present invention is described hereunder using plurality of the flooring members shown in FIG. 12. As shown in FIG. 1, a plurality of floor panels 31 are arranged on a base floor (F) such that all the guide members 20 are aligned one after another. The cover board 32 where a cable to be laid is to come out is removed, opening the housing space 10 thereunder. The head member 51 of a distributer means 50 is inserted into the passage 21 of the guide means 20. The head member 51 is pushed forward by the rope member 52 so that the distributer means 50 travels forward little by little in the passage 21. The second cover board 32 where the cable is to be introduced or the be relayed is removed (it can be removed beforehand as well) and the cable (X) is connected to the distributer means 50 by means of the connecting hole 512 of the tongue member 51 and the connecting string 60 as shown in FIG. 2. The distributer means 50 is pulled back to its entrance spot together with the cable (X) drawn by the connecting string 60 which travels through the slit of said guide means 20 as shown in FIG. 3. The cable (X) is released from the connecting string 60 into the housing space 10 and thus the cable (X) is laid in the housing space 10 over the cable laying route under the floor.

Figure 26:
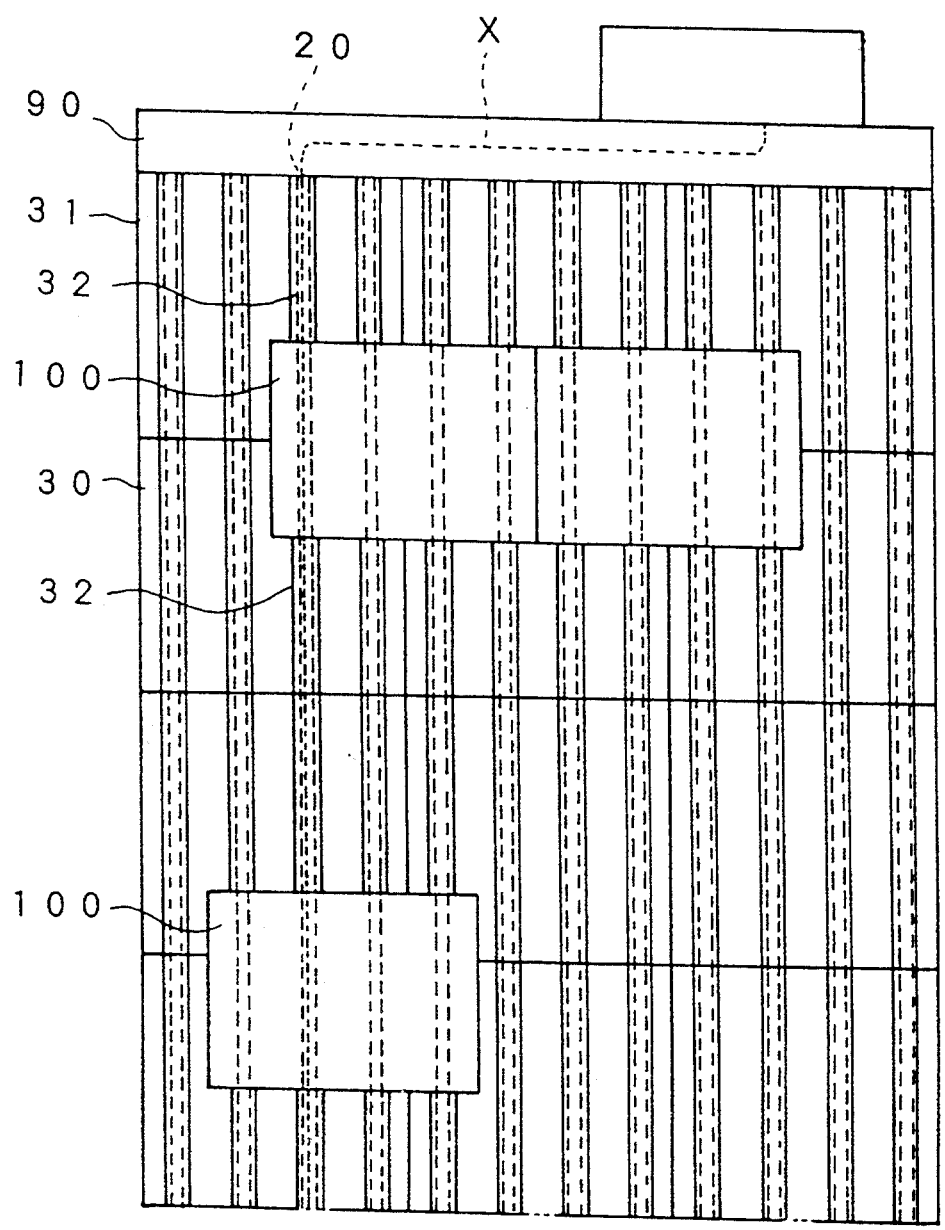
FIG. 26 illustrates a plane view showing an embodiment of a cable or pipe distribution floor plan according to the present invention.

In such a manner, it is not necessary to remove all the cover boards along the cable laying route. Therefore, it is not necessary to move the office machines 100 installed along the cable laying route, either (shown in FIG. 26).

In another embodiment method for laying cables and/or pipes according to the present invention, it is possible to first lay a pilot rope (not shown) throughout said housing space 10 in the cable laying route by means of said distributer means 50 before laying a cable or a pipe (X) and to connect a cable or a pipe (X) to said pilot rope at one end, which is then pulled (either way) through the housing space 10 together with the cable or the pipe (X) connected thereto so that the cable or the pipe is laid in the housing space 10.

As described hereto, a floor system for laying cables and/or pipes according to the present invention makes a cable and/or a pipe laying operation an easy task, without need of removing all the flooring covers along the laying routes or without need of moving already installed machines and the like along the routes.

In this disclosure, there are shown and described only the preferred embodiments of the invention, however, it is to be understood that the invention can be modified or changed within the scope of the inventive concept as expressed herein.

What is claimed is:

1. A floor system for laying cables and/or pipes underneath a floor without opening the floor except at entry and exit comprising:
   at least one housing space provided underneath a floor for housing said cables and/or pipes; and
   at least one elongated guide means disposed within said at least one housing space for guiding a cable/pipe distributer means along said at least one housing space from entry to exit; whereby said cables and/or pipes to be laid underneath said floor is accomplished without need of removing the entire floor or any office equipment thereon.

2. A floor system for laying cables and/or pipes underneath a floor without opening the floor except at entry and exit comprising:
   a housing space opening upward for housing said cables and/or pipes;
   a floor board covering said housing space;
   an elongated guide means provided on the bottom side of said floor board for guiding a cable/pipe distributer means along said housing space from entry to exit; whereby said cables and/or pipes to be laid underneath said floor is accomplished without need of removing the entire floor or any office equipment thereon.

3. A floor system for laying cables and/or pipes underneath a floor without opening the floor except at entry and exit comprising:
   a housing space provided in a base floor material for housing said cables and/or pipes;
   a floor cover covering said housing space; and
   an elongated guide means provided on the bottom side of said floor cover for guiding a cable/pipe distributer means along said housing space from entry to exit; whereby said cables and/or pipes to be laid underneath said floor is accomplished without need of removing the entire floor or any office equipment thereon.

4. A floor system for laying cables and/or pipes underneath a floor without opening the floor except at entry and exit comprising:
- a plurality of housing spaces provided in parallel with one another in a base floor for housing said cables and/or pipes;
- at least one cover board covering said plurality of housing spaces; and
- an elongated guide means provided at each said housing space on the bottom side of said at least one cover board for guiding a cable/pipe distributer means along said housing spaces from entry to exit; whereby said cables and/or pipes to be laid underneath said floor is accomplished without need of removing the entire floor or any office equipment thereon.

5. A floor system for laying cables and/or pipes underneath a floor without opening the floor except at entry and exit comprising:
- a floor block having a flooring board, a plurality of connecting leg members and a housing space for housing said cables and/or pipes; and
- an elongated guide means provided on the bottom side of said flooring board for guiding a cable/pipe distributer means along said housing space from entry to exit; whereby said cables and/or pipes to be laid underneath said floor is accomplished without need of removing the entire floor or any office equipment thereon.

6. The floor system of claim 5, wherein said bottom side of said flooring board forming said guide means is discontinuous, and opposite ends of said discontinuous guide means are rounded, so as to facilitate smooth passage through said guide means.

7. A distributor for laying cables and/or pipes underneath a floor having elongated guide means comprising:
- a head member having a shape such that said head member travels smoothly through said guide means without becoming dislodged therefrom;
- a connecting means forming part of said head member for attachment to a cable or a pipe to be laid underneath said floor; and
- a stiff rope member attached to said distributor for moving said head member forward or backward through said guide means.

8. The distributor of claim 7, wherein said guide means and said head member are round in shape, and said head member is provided with a rounded end.

9. The distributor of claim 7, wherein said guide means and said head member are substantially T-shaped.

10. The distributor of claim 9, wherein said guide means is an elongated T-shaped slot, and said head member is of compatible shape so as to be held and guided by, as well as slidable in said T-shaped slot.

11. The distributor of claim 9, wherein said head member is provided with an elongated T-shaped slot, and said guide means is of compatible shape so that said head member is held and guided by, as well as slidable along said T-shaped slot.

12. The floor system of claim 1, wherein said guide means in said housing space forms part of said floor disposed over said housing space.

13. The floor system of claim 12, wherein said plurality of guide means are aligned with one another by pin like prong members and mating pin receiving means, thereby ensuring a smooth transition between abutting guide means place in a simple line.

14. The floor system of claim 13, further including a window in said floor for each prong member so that said prong member may be placed into said mating pin receiving means.

15. The floor system of claim 12, wherein said guide means and part of said floor disposed over said housing space form a separate independent cover board panel for closing said housing space.

16. The floor system of claim 16, wherein said separate independent cover board panel is attached to said floor on a side thereof facing said housing space.

17. The floor system of claim 16, wherein said cover board panel is made of a hard material and said floor is made of a flexible material so that the combined cover board panel and floor can be rolled up when not in use.

18. The floor system of claim 12, wherein said guide means are a plurality of guide means.

19. The floor system of claim 18, wherein said plurality of guide means are two and cross each other orthogonally.

20. The floor system of claim 18, wherein said plurality of guide means are parallel to each other, and each is disposed substantially centrally in a housing space.

* * * * *